United States Patent [19]

Carr, Jr. et al.

[11] Patent Number: 4,468,568

[45] Date of Patent: Aug. 28, 1984

[54] GENERATING POWER FROM THE OCEAN UTILIZING THE THERMAL PROPERTIES OF MAGNETIC MATERIAL

[76] Inventors: Walter J. Carr, Jr., 1460 Jefferson Heights; Robert C. Miller, 1746 Williamsburg, both of Pittsburgh, Pa. 15235

[21] Appl. No.: 394,668

[22] Filed: Jul. 2, 1982

[51] Int. Cl.³ .................................................. F03G 7/04
[52] U.S. Cl. ..................................... 290/1 R; 60/398; 310/306
[58] Field of Search ................. 290/1 R; 415/DIG. 2; 60/398, 203.1, 202; 74/DIG. 9; 310/306

[56] References Cited

U.S. PATENT DOCUMENTS

| | | | |
|---|---|---|---|
| 2,549,464 | 4/1951 | Hartley | 390/1 R |
| 3,126,492 | 3/1964 | Swoboda | 310/306 |
| 3,316,415 | 4/1967 | Taylor | 310/306 |
| 3,743,866 | 7/1973 | Pire | 310/306 |
| 4,064,409 | 12/1977 | Redman | 310/306 |
| 4,210,819 | 7/1980 | Wittig et al. | 290/1 R |
| 4,230,963 | 10/1980 | Kurpanek | 310/306 |

Primary Examiner—J. V. Truhe
Assistant Examiner—A. Evans
Attorney, Agent, or Firm—Donald M. Boles

[57] ABSTRACT

A power generation system is taught utilizing a ferromagnetic material contained in a tape and rotatably disposed in a triangular configuration around a series of pulleys. The entire system is under water in the ocean so as to utilize the temperature differentials available between just below the surface of the ocean and approximately 100 meters below. The tape which is ferromagnetic passes through superconducting coils having parallel fields and thereby providing a very large magnetic field. The lower portion of the ferromagnetic tape, which is cooled by the ocean, experiences greater magnetization than the upper warmer portions of the magnetic tape. The lower portion of the tape experiencing greater magnetization is pulled up into the magnetic field and thereby causes movement of the tape. As the tape moves upward it is warmed by the ocean currents with the result that a lower portion of the tape now experiences the greater magnetization. This therefore causes continual movement. Attached to one of the pulleys is a drive belt arrangement which in turn is connected to a generator thereby causing the generator to turn and generate electricity upon movement of the magnetic tape.

12 Claims, 3 Drawing Figures

GENERATING POWER FROM THE OCEAN UTILIZING THE THERMAL PROPERTIES OF MAGNETIC MATERIAL

The invention described herein may be made, used or sold by Westinghouse Electric Corporation, Pittsburgh, PA on a royalty free, non-exclusive basis.

BACKGROUND OF THE INVENTION

This invention relates, generally, to power generation and more paticularly to the utilization of ferromagnetic materials to take advantage of temperature differentials present in the ocean for the purpose of generating power.

It is known that ferromagnetic materials exhibit different amounts of magnetization near their curie point or near a phase change. This phenomenon has generally been investigated for the purpose of providing a means for conversion into more readily usable forms of energy. Such an approach may be found in U.S. Pat. No. 3,126,492 "Ferromagnetic Energy Devices" issued Mar. 24, 1964 to T. J. Swoboda. Additionally, many methods have been envisioned to utilize ferro to paramagnetic properties such as may be found in U.S. Pat. No. 4,064,409 "Ferrofluidic Electrical Generator" issued Dec. 20, 1977 to Redman and U.S. Pat. No. 3,743,866 "Rotary Curie Point Magnetic Engine" issued July 3, 1973 to Pire.

However, these systems have generally not been economically feasible due to their overall low efficiency as well as the requirement of manmade thermal energy such as found in U.S. Pat. No. 4,230,963 "HydroThermic Energy Converter" issued Oct. 28, 1980 to Kurpanek.

It is desirable to have a device which utilizes ferromagnetic properties which utilize thermal conditions which are present in nature, thereby warranting the overall cost of a system. It is also desirable to have a device which has an overall efficiency greater than previously experienced so as to produce an economically feasible device. Such a scheme is taught in the present invention.

Briefly stated, a device for using ferromagnetic materials to generate electrical energy is shown comprising a water reservoir having a temperature differential between the surface thereof and at various depths thereat, at least one ferromagnetic continuous loop tape rotatably disposed around a plurality of rotational devices for producing differing magnetization trations at different temperatures, a plurality of rotational devices disposed in the water reservoir and rotatably attached to the ferromagnetic tape about the axis of each of the rotational devices, the plurality of rotational devices having at least a first rotating device disposed at a depth in the reservoir which is different than that of a second rotational device, magnetic field mechanisms surrounding a first portion of the tape for magnetically attracting a second portion of the tape wherein the second portion of the tape due to temperature differentials exhibits greater magnetization than the first portion of the tape thereby causing the tape to move and an electrical power generating device attached to at least one of the rotational devices for producing electrical energy upon the rotation of the ferromagnetic tape and hence the rotational device.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
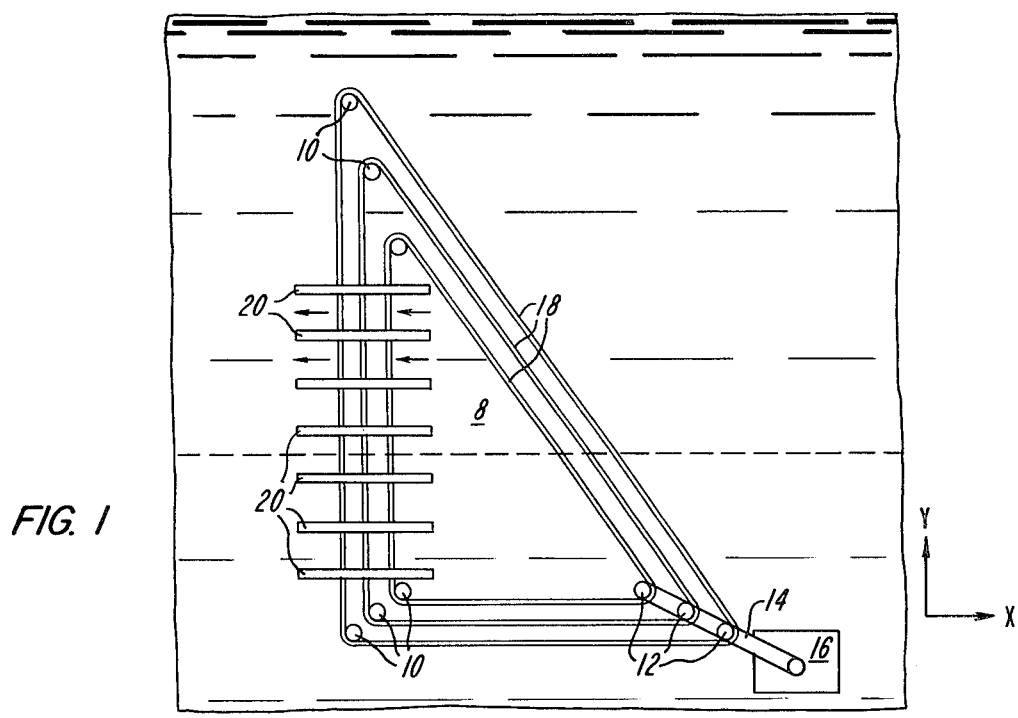
FIG. 1 is a diagrammatic representation of a ferromagnetic tape passing through superconducting electromagnetic coils and circulating around a number of pulleys.

Referring now to the drawings and in particular to FIG. 1 there is shown a diagram of the present invention in the Y-X plane. The power generation system shown generally at 8 as seen in the present figure is positioned under the ocean surface so as to take advantage of the temperature differentials present at different depths of the ocean. It is well known that in portions of the ocean a near discontinuity of 6° C. occurs in the temperature at a depth of about 60 meters with respect to the temperature near the surface. Below this point a further decrease of about 5° C. occurs over the next 40 meters (100 meters of depth). Therefore a temperature gradient of approximately 11° C. is experienced when measuring temperatures between the ocean surface and at approximately 100 meters below the ocean surface. Additionally it is well known that natural ocean currents of approximately 50 to 100 centimeters per second which aid in heat transfer are not uncommon.

Figure 3:
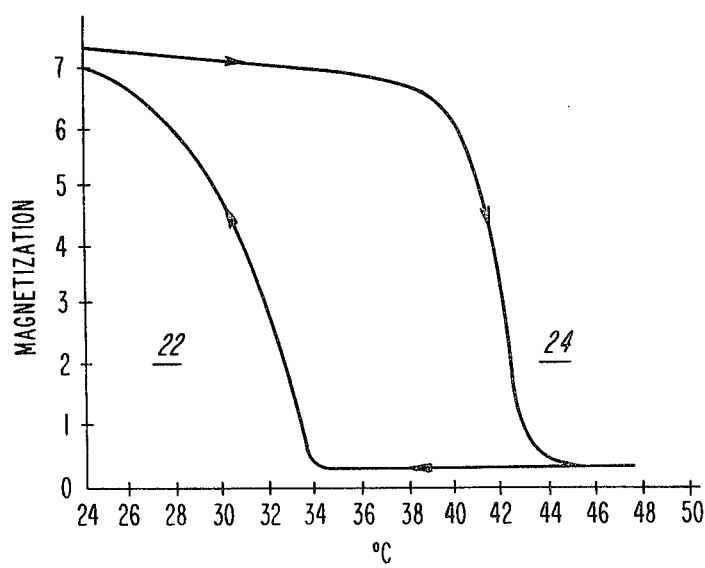
FIG. 3 is a magnetization versus temperature curve of the ferromagnetic material Manganese Arsenide (MnAs), as it goes through a first order phase change.

Utilizing this temperature gradient is the power generation system 8 found in FIG. 1. In the preferred embodiment of the present invention there are nine ferromagnetic tapes (only there are shown in this view) which travel in the direction shown, that is, clockwise around the pulleys 10 and the drive shafts 12. Surrounding the vertical leg of the ferromagnetic tape 18 are superconducting coils 20 which are used to produce a large magnetic field. The temperature distribution of the tape 18 tends to assume the temperature profile of the ocean which thereby determines the magnetization of the tape 18 in that the magnetization of a ferromagnetic material depends upon temperature (FIG. 3). The ferromagnetic material in the preferred ebodiment of the present invention is comprised of Manganese Arsenide (MnAs) having a few percent of phosphorus (P) added (although other materials may be utilized). The lower portion of tape 18 will be cooler than the upper portion of tape 18 due to the temperature differential of the water as aided by ocean currents shown generally at 26. Through the use of the superconducting coils 20 a magnetic field is produced in a portion of the tape 18. Since, as mentioned earlier, the lower end of tape 18 experiences a higher magnetization, tape 18 will be pulled vertically upward into the maximum portion of the field of the coils 20. However, as the tape 18 moves upward the temperature and therefore the magnetization at a point on the tape 18 that is being pulled into the field 20 changes. This therefore causes tape 18 to continuously move in a clockwise direction around the pulleys 10 and thereby turning drive shaft 12. Attached to the drive shafts 12 are drive belts 14 which turn with the drive shaft 12 and in turn cause the shaft of a generator shown generally at 16 to turn and thereby generate electrical energy.

The superconducting coils 20 in the preferred embodiment of the present invention are separate coils, each coil having current circulating therein in the same direction as the other coils. This therefore provides a magnetic field for each superconducting coil 20 in the same direction. The strength of the magnetic field is extremely important in that the stronger the magnetic field the larger the attraction of the ferromagnetic tapes 18. This, will therefore affect the efficiency of the overall power generation system 8. Additionally in the preferred embodiment of the present invention the wire comprising the superconducting coils 20 will be made of a niobium-tin alloy (Nb3Sn) although it is to be understood that different materials may be used without departing from the spirit and scope of the present invention. It is to be understood however that the coils 20 may be connected in series or parallel combinations as long as the field generated by each coil 20 is in the same direction. Further, it is to be understood that the coils 20 may be spaced differently than that shown. Additionally different numbers of coils 20 may be utilized or a single large coil could be used. Further, nonsuperconducting coils may be utilized.

Figure 2:
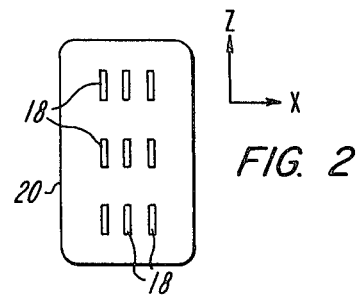
FIG. 2 is a partial sectional view taken through A—A of FIG. 1 showing additional sets of magnetic tapes.

Referring now to FIG. 2 a partial sectional top view of FIG. 1 is shown. This view shows the power generation system in the Z-X plane. Here it is clearly visible that the superconducting coils 20 encircle the ferromagnetic tapes 18. Additionally the ferromagnetic tapes 18 are "multiplied or paralleled", thereby providing additional force. It is to be understood that fewer or additional tapes in the Z or the X (FIG. 1) direction may be utilized without departing from the spirit and scope of the present invention. Additionally the tapes 18 in, for example, the Z direction could be significantly wider thereby decreasing the number of tapes.

The tapes 18 shown in FIGS. 1 and 2 where requiring mechanical strength must be flexible to thereby accommodate turns. Therefore, in the preferred embodiment of the present invention a hollow steel tape (not shown) is utilized to surround the magnetic material. This is necessary since the ferromagnetic material used in the preferred embodiment of the present invention (MnAs) is not strong enough to support itself. It is to be understood however that the hollow steel tape or any other support structure for the magnetic material may be omitted should the magnetic material be treated or otherwise formed so as to not require external support. The hollow steel tape may also be compartmentalized so as to minimize migration of the magnetic material contained therein from one portion of the tape 18 to another portion of the tape 18. It is to be understood however that other materials then steel may be utilized to contain the tape such as, for example, plastic, rubber or aluminum.

Referring now to FIG. 3 a magnetization versus temperature curve for Manganese Arsenide is shown. Here the ferromagnetic region 22 is readily discernible from the paramagnetic region 24. Also observable is the hysteresis over a 10° C. range with a $\Delta T$ of approximately the same amount required for full change of magnetization. This required $\Delta T$ for this material is within the range of $\Delta T$ found in the ocean and results in a change of magnetization ($\Delta M$) of approximately 600 gauss. In the preferred embodiment of the present invention manganese arsenide (MnAs) having a small amount phosphorus P, as mentioned earlier, is utilized. This shifts the hysteresis curve shown in FIG. 3 to the left so that the $\Delta M$ occurs over the temperature range available in the ocean.

It is to be understood that many alternate embodiments of the present invention are possible without departing from the spirit and scope of the present invention. For example, the drive belt 14 shown in FIG. 1 could be comprised of gears or chains while the general shape of the power generation system 8 could be generally rectangular, square or any other suitable shape so as to permit the necessary temperature changes above and below the curie point or phase change. Additionally a different arrangement for generating power than the generator 16 may be utilized such as including a transmission or intermediate prime mover to drive a generator or any other suitable means or position so as to utilize the movement of the tape and thereby generate electrical power. Further other magnetic materials such as Iron Nickel (FeNi), an alloy thereof or any other suitable material experiencing a ferromagnetic to paramagnetic phase transition in the temperature range available may be utilized. It is also to be understood that the present invention may be utilized in any body of water experiencing a sufficient temperature differential.

Therefore, in addition to the above-enumerated advantages, the disclosed invention produces a power generation system which is cost effective, providing modular growth capabilities and utilizing the vast supply of thermal energy available in the ocean. Additionally, the described invention provides an environmentally neutral device, in terms of pollution for producing electricity.

What we claim is:

1. A device for using ferromagnetic material to generate electrical energy, comprising:
   a water reservoir having a temperature differential between the surface thereof and at various depths thereat;
   at least one ferromagnetic tape means rotatably disposed around a plurality of rotational means for producing different magnetization at different temperatures, said ferromagnetic tape means forming a continuous loop;
   plurality of rotational means disposed in said water reservoir for permitting the rotation of said ferromagnetic tape means about the axis of each rotational means, said plurality of rotational means having at least one first rotational means disposed at a depth in said reservoir which is different than that of at least one second rotational means, each rotational means being rotated about its own axis by movement of said tape means;
   at least one magnetic field means surrounding a first portion of said tape means for moving by magnetic attraction a second portion of said tape means, said second portion of said tape being at a temperature different than said first portion and therefore having greater magnetization than said first portion; and
   electrical power generation means attached to at least one rotational means for producing electrical energy upon the rotation of said tape means.

2. A device according to claim 1 wherein said water reservoir is an ocean having a temperature gradient between the surface of the ocean and at various depths therebelow.

3. A device according to claim 1 wherein three rotational means are disposed in said water reservoir in a triangular configuration.

4. A device according to claim 3 wherein said magnetic field means are disposed at a point in one of the legs of said triangular configuration.

5. A device according to claim 1 wherein said magnetic field means is comprised of a superconducting coil.

6. A device according to claim 1 wherein said magnetic field means are comprised of a plurality of superconducting coils.

7. A device according to claim 1 wherein said rotational means are comprised of rotating shafts.

8. A device according to claim 1 wherein said rotational means are comprised of pulleys.

9. A device according to claim 1 wherein said rotational means are disposed in a generally rectangular configuration.

10. A device according to claim 1 wherein said ferromagnetic tape means is comprised of a manganese, arsenide alloy having phosphorous added thereto.

11. A device according to claim 6 wherein the magnetic fields of said superconducting coils are oriented so as to be parallel to each other.

12. A device for using ferromagnetic materials to generate electrical energy, comprising:

a body of water having a temperature differential between the surface thereof and at various depths thereat;

at least one ferromagnetic tape means rotatably disposed around a plurality of rotating shaft means for producing differing magnetization at different temperatures, said tape means forming a continuous loop;

plurality of rotational shaft means disposed in said body of water for permitting the rotation of said ferromagnetic tape means about the axis of each rotational shaft means, having at least one first rotational shaft means disposed at a depth in said body of water which is different than that of at least one second rotational shaft means;

at least one superconducting magnet means surrounding a first porton of said tape means for moving by magnetic attraction a second portion of said tape means, said second portion of said tape means being at a temperature different than that of said first portion and therefore having greater magnetization than said first portion of said tape means; and electrical power generation means attached to at least one of said rotational shaft means for producing electrical energy upon the rotation of said tape means about said shaft means.

* * * * *